(12) United States Patent
Aston et al.

(10) Patent No.: US 11,725,774 B2
(45) Date of Patent: Aug. 15, 2023

(54) ISOLATION COUPLER FOR A STRUCTURAL ASSEMBLY AND METHOD FOR ATTENUATING A LOAD

(71) Applicant: The Boeing Company, Chicago, IL (US)

(72) Inventors: Richard W. Aston, Brea, CA (US); Michael John Langmack, Huntington Beach, CA (US); Anna M. Tomzynska, Seal Beach, CA (US); Matthew Herrmann, Rancho Palos Verdes, CA (US); Emily C. Woods, Redondo Beach, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/378,902

(22) Filed: Jul. 19, 2021

(65) Prior Publication Data

US 2021/0341098 A1 Nov. 4, 2021

Related U.S. Application Data

(62) Division of application No. 16/214,638, filed on Dec. 10, 2018, now Pat. No. 11,105,459.

(51) Int. Cl.
*F16F 7/00* (2006.01)
*F16M 13/02* (2006.01)
(Continued)

(52) U.S. Cl.
CPC ........... *F16M 13/02* (2013.01); *F16F 1/3732* (2013.01); *F16F 15/08* (2013.01); *B64D 47/00* (2013.01);
(Continued)

(58) Field of Classification Search
USPC ........ 248/562, 566, 574, 580, 581, 603, 683
See application file for complete search history.

(56) References Cited

U.S. PATENT DOCUMENTS

| 6,676,116 B2 | 1/2004 | Edberg et al. |
| 2003/0183995 A1 | 10/2003 | Edberg et al. |
| (Continued) | | |

FOREIGN PATENT DOCUMENTS

| CN | 1820151 | 8/2006 |
| EP | 1467121 | 10/2004 |
| (Continued) | | |

OTHER PUBLICATIONS

Canadian Intellectual Property Office, Office Action, App. No. 3,061,511 (dated Dec. 19, 2022).

(Continued)

*Primary Examiner* — Alfred J Wujciak
(74) *Attorney, Agent, or Firm* — Walters & Wasylyna LLC

(57) ABSTRACT

An isolation coupler for coupling a functional element to a support structure includes a first bracket. The first bracket includes a number of first-bracket sides. The number of first-bracket sides forms a closed polygonal shape, in plan view. The isolation coupler further includes a number of isolators coupled to each one of the first-bracket sides. The isolation coupler also includes a second bracket. The second bracket includes a number of second-bracket sides. The second bracket sides are coupled to the isolators. The number of second-bracket sides is equal to the number of first-bracket sides and forms the closed polygonal shape, in plan view. The isolators separate each one of the first-bracket sides from a corresponding one of the second-bracket sides to attenuate a load transferred from the first bracket to the second bracket.

20 Claims, 11 Drawing Sheets

(51) Int. Cl.
*F16F 15/08* (2006.01)
*F16F 1/373* (2006.01)
*B64D 47/00* (2006.01)

(52) U.S. Cl.
CPC ........... *F16F 7/00* (2013.01); *F16F 2224/025* (2013.01); *F16F 2234/02* (2013.01)

(56) References Cited

U.S. PATENT DOCUMENTS

2014/0305334 A1\* 10/2014 Blase ................ B61C 17/00
 248/562
2014/0305344 A1  10/2014 Barralet et al.

FOREIGN PATENT DOCUMENTS

| JP | H09-296626 | 11/1997 |
| JP | H09296626 | 11/1997 |
| KR | 2018-0117937 | 10/2018 |

OTHER PUBLICATIONS

China National Intellectual Property Administration, Office Action, with English translation, App. No. 201911252386.4 (dated Sep. 5, 2022).

\* cited by examiner

ISOLATION COUPLER FOR A STRUCTURAL ASSEMBLY AND METHOD FOR ATTENUATING A LOAD

PRIORITY

This application is a divisional of U.S. Ser. No. 16/214,638 filed on Dec. 10, 2018.

GOVERNMENT RIGHTS

The invention described herein was made in the performance of work under NASA Contract No. NNK14MA75C and is subject to the provisions of Section 305 of the National Aeronautics and Space Act of 1958 (72 Stat. 435: 42 U.S.C. 2457).

FIELD

The present disclosure is generally related to structural assemblies and, more particularly, to an isolation coupler for a structural assembly that couples a functional element to a support structure.

BACKGROUND

Within various industries, it may be desired, or even necessary, to attenuate shock and/or vibrations transmitted from a supporting structure to a piece of functional equipment. Shock loads are typically large magnitude, short duration forces. Shock loads may have vibration frequencies ranging from a few hertz to many kilohertz or more, may be transient or continuing in nature, and may have axial and/or lateral directional components. For example, in the aerospace industry, there is a need to prevent substantial mechanical vibrations and/or mechanical shocks generated during operation of an aerospace vehicle (e.g., an aircraft, spacecraft, satellite, rocket, etc.) from reaching functional equipment mounted to a supporting structure of the vehicle. If a sufficient shock load is transmitted to the functional equipment, mechanical vibrations and/or mechanical shocks may damage the functional equipment or cause the functional equipment to fail. Additionally, in the aerospace industry, space and weight constraints of the vehicle and a need for a high degree of flexibility for strength and load-attenuation requirements may limit use of existing shock attenuation methods.

Accordingly, those skilled in the art continue with research and development efforts in the field of load attenuation and, as such, systems and methods, intended to address the above-identified concerns, would find utility.

SUMMARY

The following is a non-exhaustive list of examples, which may or may not be claimed, of the subject matter according to the present disclosure.

In an example, a disclosed isolation coupler for coupling a functional element to a support structure includes a first bracket. The first bracket includes a number of first-bracket sides. The number of first-bracket sides forms a closed polygonal shape, in plan view. The isolation coupler further includes a number of isolators coupled to each one of the first-bracket sides. The isolation coupler also includes a second bracket. The second bracket includes a number of second-bracket sides. The second bracket sides are coupled to the isolators. The number of second-bracket sides is equal to the number of first-bracket sides and forms the closed polygonal shape, in plan view. The isolators separate each one of the first-bracket sides from a corresponding one of the second-bracket sides to attenuate a load transferred from the first bracket to the second bracket.

In an example, a disclosed structural assembly includes a support structure. The structural assembly further includes a first bracket coupled to the support structure. The first bracket includes a number of first-bracket sides. The number of first-bracket sides forms a closed polygonal shape, in plan view. The structural assembly also includes a number of isolators coupled to each one of the first-bracket sides. The structural assembly additionally includes a second bracket. The second bracket includes a number of second-bracket sides coupled to the isolators. The number of second-bracket sides is equal to the number of first-bracket sides and forms the closed polygonal shape, in plan view. The structural assembly further includes a functional element coupled to the second bracket. Each one of the isolators separates one of the first-bracket sides from a corresponding one of the second-bracket sides to attenuate a load transferred from the first bracket to the second bracket.

In an example, a disclosed method for attenuating a load from a support structure to a functional element of a structural assembly includes steps of coupling a first bracket to the support structure. The first bracket includes a number of first-bracket sides. The number of first-bracket sides forms a closed polygonal shape, in plan view. A number of isolators is coupled to each one of the first-bracket sides. The method further includes a step of coupling each one of a number of second-bracket sides of a second bracket to the number of isolators, coupled to each one of the first-bracket sides. The number of second-bracket sides is equal to the number of first-bracket sides and forms the closed polygonal shape, in plan view. The method also includes a step of coupling the functional element to the second bracket. The method additionally includes a step of applying the load from the support structure to first bracket. The method further includes a step of attenuating the load from the first bracket to the second bracket by transferring the load through the isolators.

Other examples of the disclosed system and method will become apparent from the following detailed description, the accompanying drawings and the appended claims.

DETAILED DESCRIPTION

Figure 1:
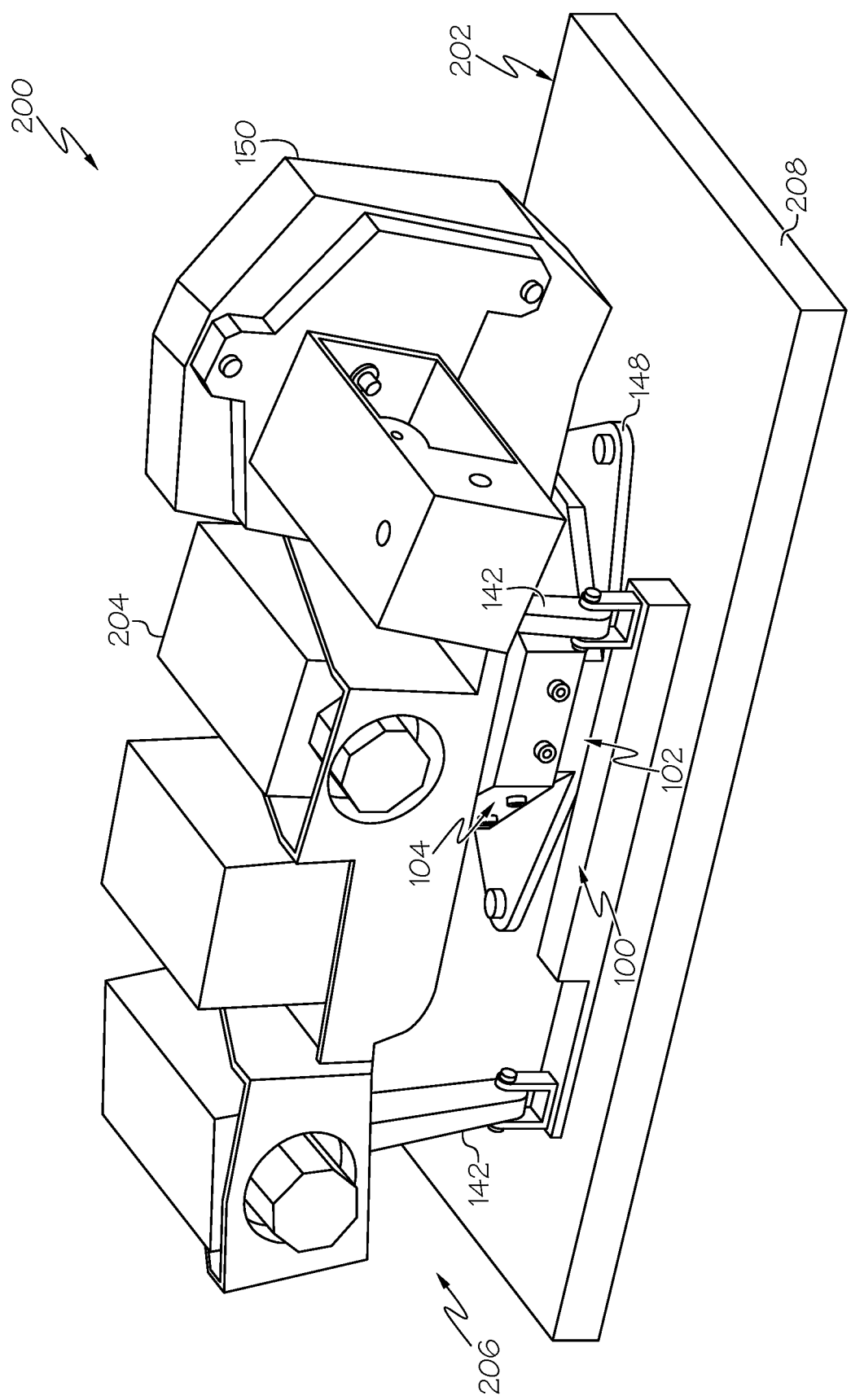
FIG. 1 is a schematic, perspective view of an example of a structural assembly using an example of an isolation coupler to couple a functional element to a support structure.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

As used herein, the phrase "a number of" items means one or more of those items. For example, a number of items may include one item or a plurality of items. For the purpose of simplicity, throughout the present disclosure and unless otherwise indicated, use of the plural form of the referred to item means the number of items. For example, unless otherwise indicated, use of "items" means "the number of items."

Referring generally to FIGS. 1-10, the present disclosure provides examples of an isolation coupler 100 (FIGS. 4-8) of a structural assembly 200 (FIGS. 1-3) that is used to couple a functional element 204 and a support structure 202 together and that provides load attenuation between the support structure 202 and the functional element 204. In one or more examples, the isolation coupler 100 is a two-piece structural bracket assembly having a polygonal shape and a tongue and groove interface. The polygonal tongue and groove interface includes a series of isolators 110 (FIGS. 9 and 10) that isolate the two structural brackets from each other and attenuate a load being transferred from one bracket to the other bracket. The quantity of the polygon facets and the quantity of the isolators 110 are tailorable for a particular application to achieve an optimal balance of strength and load isolation and, thus, the structural assembly 200 using the isolation coupler 100 provides a high degree of design flexibility. The structural assembly 200 using the isolation coupler 100 provides a high degree of structural load dampening because of the energy absorbing properties of the isolators 110. The structural assembly 200 using the isolation coupler 100 provides a high degree of vibration and shock isolation (e.g., between approximately 3 decibels (dB) and 20 dB) over a wide frequency spectrum.

Figure 2:
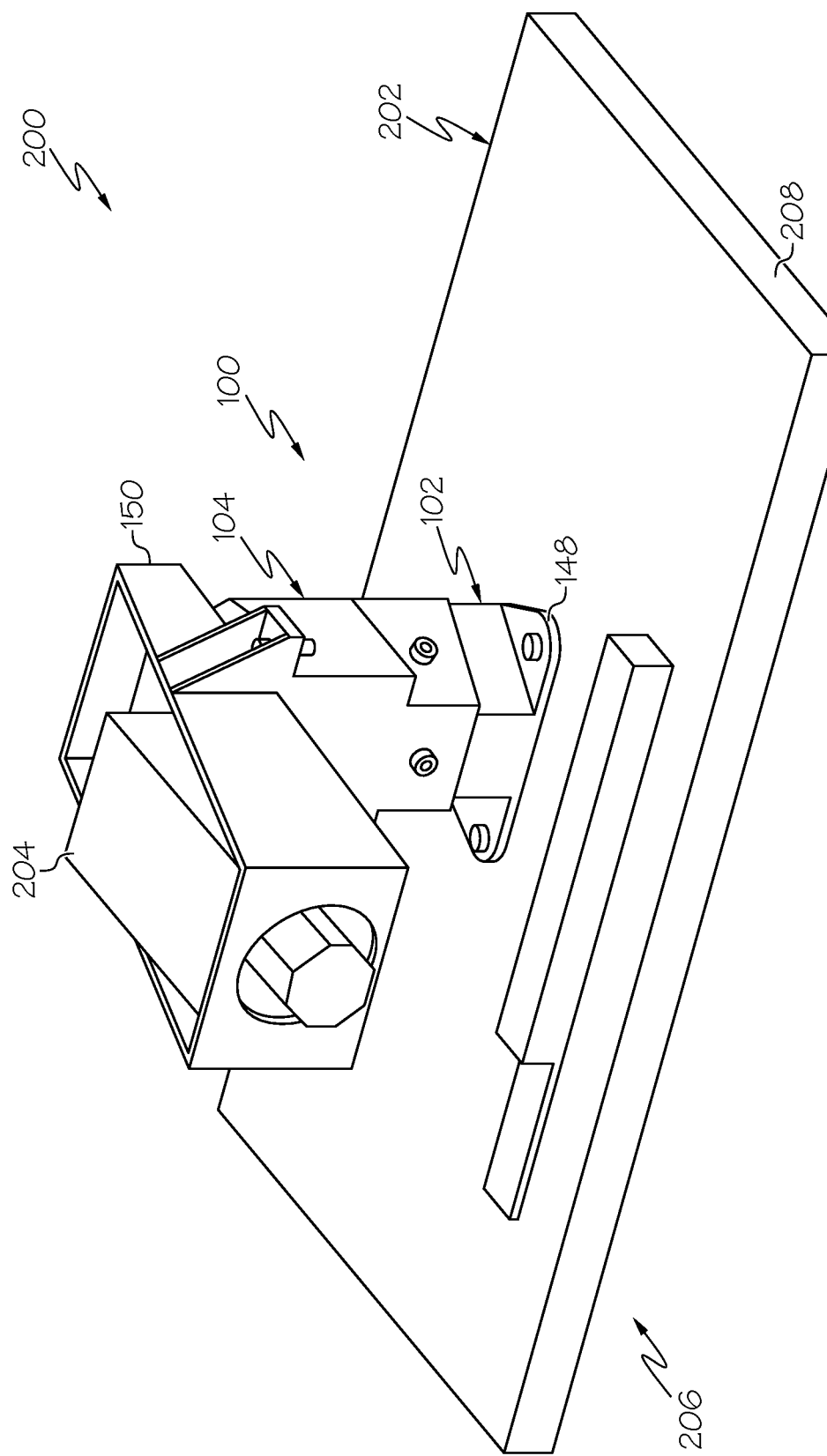
FIG. 2 is a schematic, perspective view of an example of the structural assembly using an example of the isolation coupler to couple the functional element to the support structure.
Figure 3:
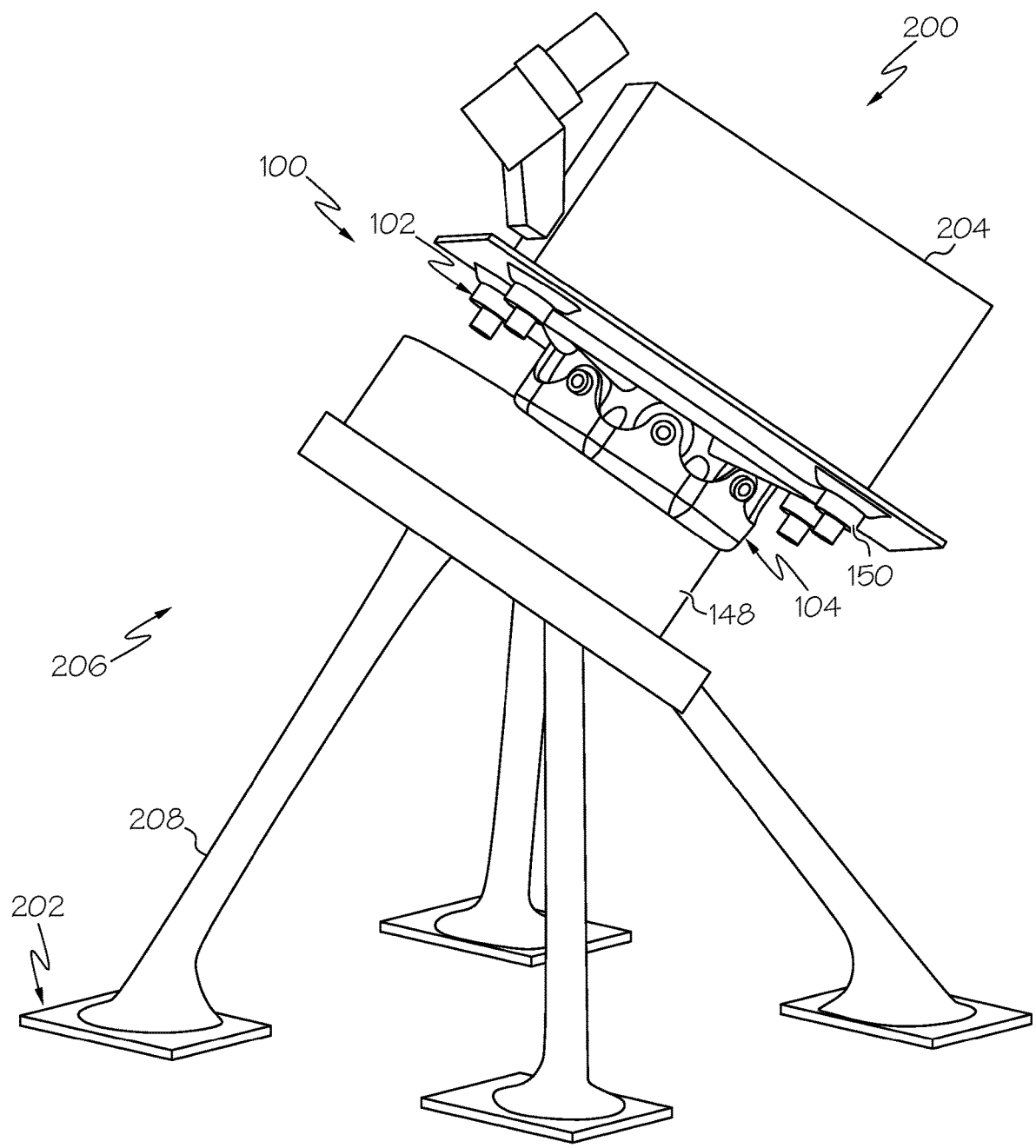
FIG. 3 is a schematic, perspective view of an example of the structural assembly using an example of the isolation coupler to couple the functional element to the support structure.

Referring to FIGS. 1-3, the present disclosure provides examples of the structural assembly 200. The structural assembly 200 includes the support structure 202. The structural assembly 200 also includes a number of functional elements 204. The functional elements 204 are coupled (e.g., mounted) to the support structure 202. The structural assembly 200 also includes an isolation coupler 100. The isolation coupler 100 is a shock attenuating mounting bracket assembly that couples (e.g., mechanically or structurally couples) the functional elements 204 to the support structure 202. The isolation coupler 100 is configured to attenuate a load, such as mechanical shock loads and/or mechanical vibration loads, from the support structure 202 to the functional elements 204.

Referring generally to FIGS. 1-3 and particularly to FIGS. 4-8, the present disclosure also provides examples of the isolation coupler 100 for coupling functional elements 204 to the support structure 202. The isolation coupler 100 includes a first bracket 102. The first bracket 102 includes a number of first-bracket sides 106. The isolation coupler 100 also includes a number of isolators 110 coupled to each one of the first-bracket sides 106. The isolation coupler 100 further includes a second bracket 104. The second bracket 104 includes a number of second-bracket sides 108. The second-bracket sides 108 are coupled to the isolators 110. The isolators 110 separate and isolate each one of the first-bracket sides 106 from a corresponding one of the second-bracket sides 108 to attenuate a load transferred from the first bracket 102 to the second bracket 104.

The isolation coupler 100 provides for attenuation of a load, or a force, exerted on the first bracket 102 and transmitted to the second bracket 104 via interaction with, or through, the isolators 110. Accordingly, the isolation coupler 100 provides for attenuation of the load being transferred from the support structure 202 to the functional element 204. In some examples, the isolation coupler 100 may prevent the load exerted on the support structure 202 from reaching the functional element 204. In an example, the load includes mechanical shock (e.g., a shock load). In an example, the load includes mechanical vibration (e.g., a vibration load). In an example, the load includes mechanical shock and mechanical vibration. The mechanical forces associated with the load may be distributed or may be concentrated over a small area of the body, and may be applied at an angle to a surface (e.g., tangential or normal).

For the purpose of the present disclosure, the terms "attenuation," "to attenuate," and similar terms have their ordinary meaning as known to those skilled in the art and means to weaken or to reduce in force, intensity, or effect. As used herein, the term "mechanical shock" has its ordinary meaning as known to those skilled in the art and may refer to a nonperiodic disturbance of a mechanical system due to a change in motion characterized by suddenness and severity, with maximum forces being reached within a relatively short time duration. As used herein, the term "mechanical vibration" has its ordinary meaning as known to those skilled in the art and may refer to a time-varying disturbance of a mechanical system from an equilibrium condition.

Figure 12:
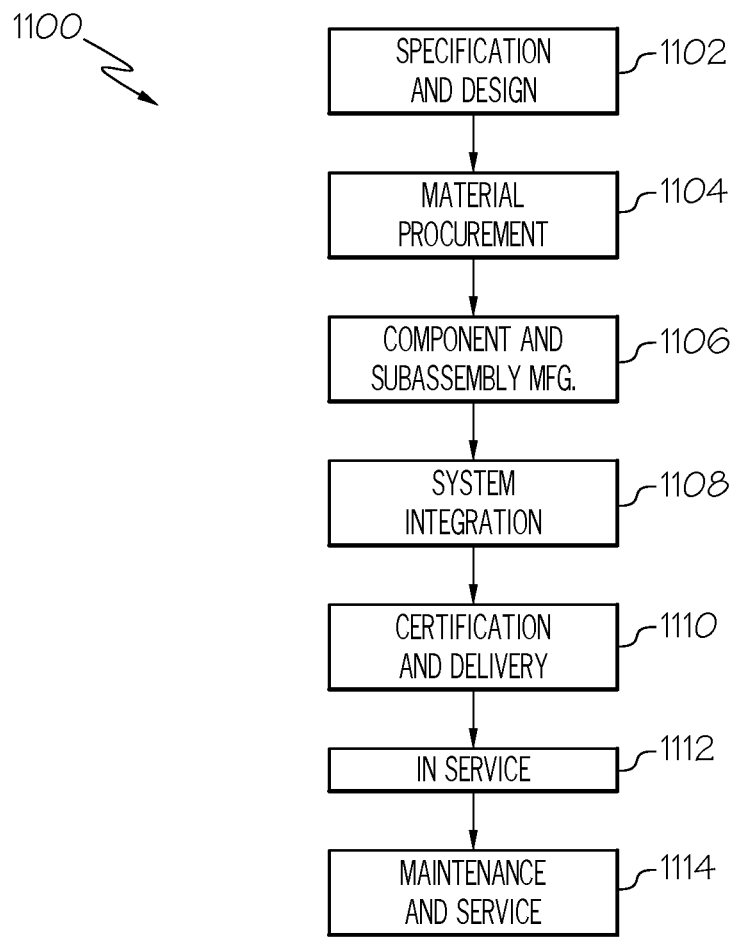
FIG. 12 is a flow diagram of an example aircraft production and service methodology.

As illustrated in FIGS. 1-3, the structural assembly 200 may be any type of mobile platform 206 that experiences loading due to a change in motion. As illustrated in FIG. 12, in an example, the structural assembly 200 is an aerospace vehicle 1200 such as an aircraft, a spacecraft, a satellite, a rocket, a missile, an unmanned aerial vehicle, and the like. In other examples, the structural assembly 200 is a land vehicle, a watercraft, an autonomous vehicle, a robot, or other type of movable platform.

Referring to FIGS. 1-3, the support structure 202 may be any suitable supporting structure of the structural assembly 200 to which the functional elements 204 are mounted, such as a frame 208 of the mobile platform 206 (e.g., an airframe 1202 of the aerospace vehicle 1200) (FIG. 12). As illustrated in FIGS. 1 and 2, in an example, the frame 208 is, or includes, a mounting support plate. As illustrated in FIG. 3, in another example, the frame 208 is, or includes, a multi-legged support stand, such as a tripod, quadpod, or the like.

Referring to FIGS. 1-3, the functional elements 204 may be any piece of functional equipment that performs a function during operation of the structural assembly 200 and the function of which may be negatively effected by mechanical shock and/or mechanical vibration from the support structure 202. As illustrated in FIGS. 1 and 2, in an example, the functional elements 204 are, or include, a vision system (e.g., a vision system 1218 of the aerospace vehicle 1200) (FIG. 12), such as cameras, sensors, or other components of a vision system of the mobile platform 206. In another example, the functional elements 204 are, or include, a propulsion system (e.g., a propulsion system 1208 of the aerospace vehicle 1200), such as engines, thrusters (e.g., a Hall-effect thruster (HET)), or other components of a propulsion system of the mobile platform 206. In another example, the functional elements 204 are, or include, a computer processing system (e.g., a processing system 1220 of the aerospace vehicle 1200), such as computing hardware or other components of a computer processing system of the mobile platform 206. In another example, the functional elements 204 are, or include, an avionics system or other electronics system of the mobile platform 206 (e.g., a portion of an electrical system 1210 of the aerospace vehicle 1200).

As illustrated in FIGS. 1-8, the number of first-bracket sides 106 and the number of second-bracket sides 108 are equal to each other. In other words, each one of the first-bracket sides 106 defines an edge, or side, of the polygonal shape of the first bracket 102 and each one of the second-bracket sides 108 defines an edge, or side, of the polygonal shape of the second bracket 104.

In an example, the number of first-bracket sides 106 and the number of second-bracket sides 108 are selected to form a closed polygonal shape. In other words, the first-bracket sides 106 of the first bracket 102 form the closed polygonal shape, in plan view, and the second-bracket sides 108 of the second bracket 104 form the same closed polygonal shape, in plan view. For the purpose of the present disclosure, the terms "closed polygon," "closed polygonal shape," and similar terms have their ordinary meaning as known to those skilled in the art and refer to a plane figure that is bounded by a finite chain of straight line segments closing in a loop to form a closed polygonal shape in plan view. In an example, the closed polygon refers to a simple polygon that is a flat shape consisting of straight, non-intersecting line segments or sides that are joined pair-wise to form a closed path.

Referring to FIGS. 1-8, the number of first-bracket sides 106 of the first bracket 102 and the number of second-bracket sides 108 of the second bracket 104 may be any number suitable to form the selected, or desired, polygonal shape, such as the selected closed polygonal shape, of the isolation coupler 100, such as three or more. Selection of a particular number of first-bracket sides 106 and second-bracket sides 108 and, thus, selection of a particular corresponding polygonal shape (i.e., the number and relative orientation of the bracket sides) provides for a desired coupling strength between the first bracket 102 and the second bracket 104. Generally, the greater the number of first-bracket sides 106 and second-bracket sides 108, the greater the level of coupling strength provided between the first bracket 102 and the second bracket 104.

Figure 4:
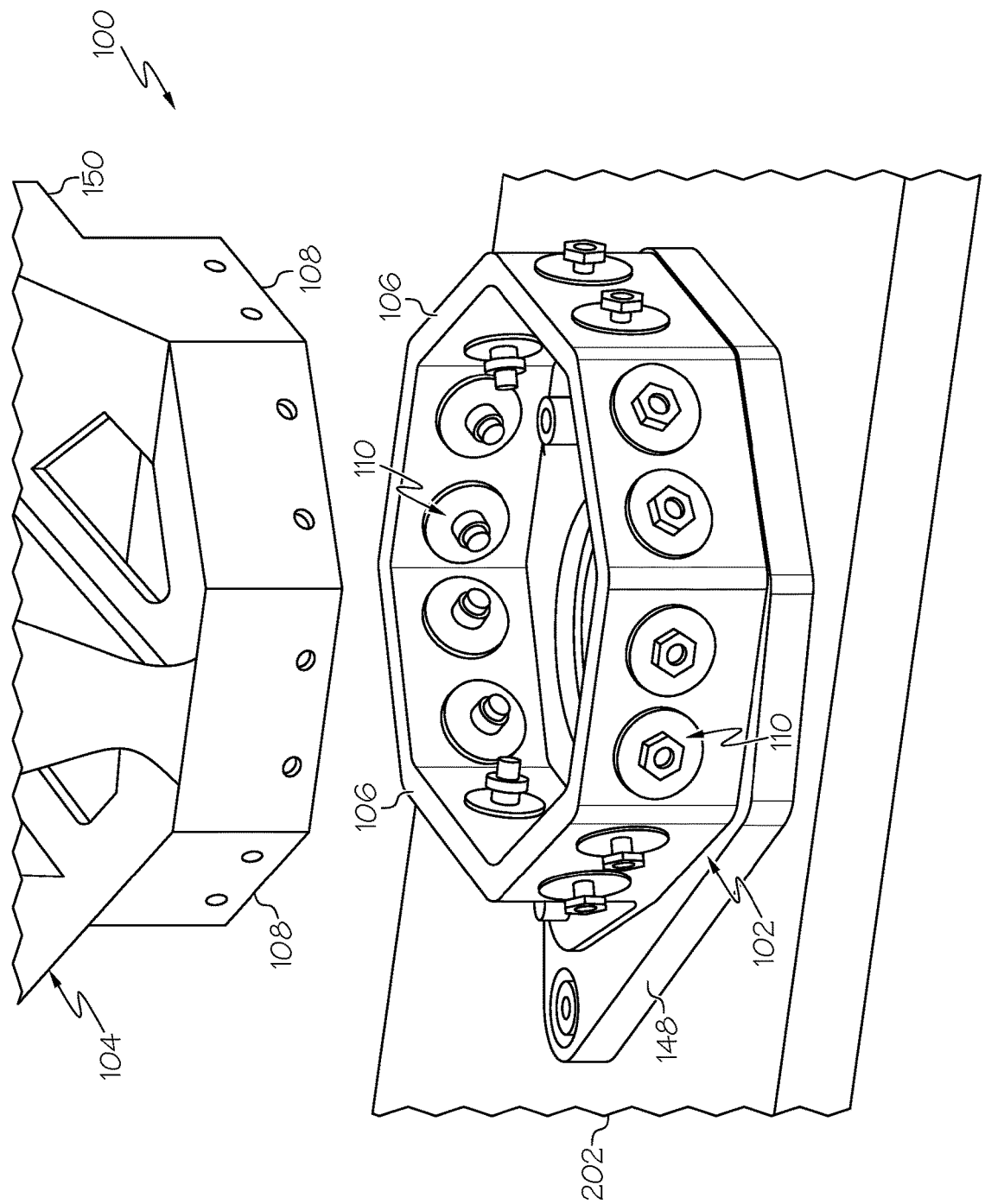
FIG. 4 is a schematic, perspective view of an example of a portion of the isolation coupler.
Figure 5:
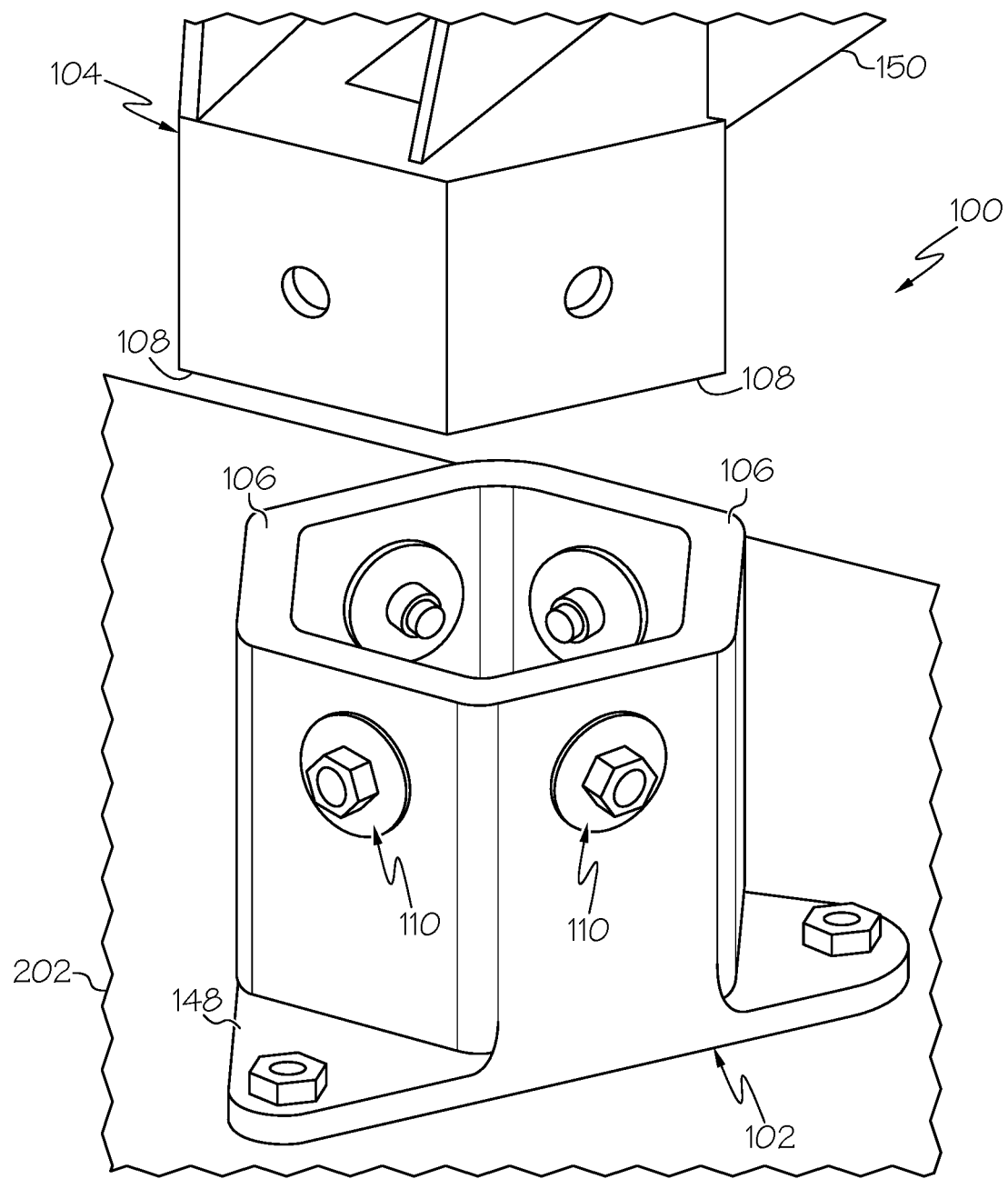
FIG. 5 is a schematic, perspective view of a portion of the isolation coupler.

In an example, the number of first-bracket sides 106 and the number of second-bracket sides 108 is four and the closed polygonal shape is a quadrilateral. As illustrated in FIGS. 2 and 5, in another example, the number of first-bracket sides 106 and the number of second-bracket sides 108 is six and the closed polygonal shape is hexagon. As illustrated in FIGS. 1, 3, 4, and 6-8, in another example, the number of first-bracket sides 106 and the number of second-bracket sides 108 is eight and the closed polygonal shape is octagon.

In an example, each one of the number of first-bracket sides 106 of the first bracket 102 is contiguous with (e.g., is directly connected to and/or shares a common border with) an adjacent one of the number of first-bracket sides 106. Similarly, in an example, each one of the number of second-bracket sides 108 of the second bracket 104 is contiguous with (e.g., is connected to and/or shares a common border with) an adjacent one of the number of second-bracket sides 108.

Alternatively, in an example, one or more of the number of first-bracket sides 106 of the first bracket 102 is separate from (e.g., is not directly connected to and/or does not share a common border with) an adjacent one of the number of first-bracket sides 106. Similarly, in an example, one or more of the number of second-bracket sides 108 of the second bracket 104 is separate from (e.g., is not connected to and/or does not share a common border with) an adjacent one of the number of second-bracket sides 108.

The number of first-bracket sides 106 selected for the first bracket 102 and the number of second-bracket sides 108 selected for the second bracket 104 may depend on various factors, including, but not limited to, a desired loading capacity (e.g., a maximum loading requirement) of the isolation coupler 100, a desired stiffness of the isolation coupler 100 (e.g., of the interface between the first bracket 102 and the second bracket 104), and/or a desired strength of the isolation coupler 100, among other factors. Generally, the number of first-bracket sides 106, the number of second-bracket sides 108, the overall size and/or closed polygonal shape of the first bracket 102 and the second bracket 104, the two-dimensional geometry and/or size of the first-bracket sides 106 and the second-bracket sides 108 are optimized based on a tradeoff between strength of the isolation coupler 100, stiffness of the isolation coupler 100, space restrictions for placement of the isolation coupler 100, weight restrictions of the isolation coupler 100, and/or the size and weight of the functional element 204. As such, the disclosed isolation coupler 100 provides a means to tailor the coupling between the functional element 204 and the support structure 202 based on such factors.

As best illustrated in FIGS. 4-8, the number of isolators 110 selected for any one of the first-bracket sides 106 may be any number suitable to provide a desired level of load attenuation between any pair of one of the first-bracket sides 106 and a corresponding one of the second-bracket sides 108. Selection of the number of isolators 110 provides for adjustable, or tailorable, levels of load attenuation between the first bracket 102 and the second bracket 104. The number of isolators 110 and the material composition of the isolators 110 may be selected to balance the strength of the isolator 110 and the desired internal dampening provided by the isolator 110 for a particular application of the isolation coupler 100.

As best illustrated in FIGS. 5-8, in an example, each one of the first-bracket sides 106 includes one isolator 110 coupling the first-bracket side 106 with a corresponding second-bracket side 108. As best illustrated in FIG. 4, in another example, each one of the first-bracket sides 106 include two isolators 110 coupling the first-bracket side 106 with a corresponding second-bracket side 108. In another example, each one of the first-bracket sides 106 include more than two isolators 110 coupling the first-bracket side 106 with a corresponding second-bracket side 108. Generally, the greater the number of isolators 110, the higher the level of load attenuation provided between the first bracket 102 and the second bracket 104.

As best illustrated in FIGS. 4-8, in an example, each one of the first-bracket sides 106 includes the same number of isolators 110 coupling each one of the first-bracket sides 106 with corresponding ones of the second-bracket sides 108. In another example, at least one of the first-bracket sides 106 has a different number of isolators 110 than at least another one of the first-bracket sides 106. Selection of the number of isolators 110 per first-bracket side 106 provides for adjustable levels of load attenuation between each one of the first-bracket sides 106 and a corresponding one of the second-bracket sides 108. Generally, the greater the number of isolators 110 per first-bracket side 106, the higher the level of load attenuation provided between the first-bracket side 106 and a corresponding second-bracket side 108.

Figure 6:
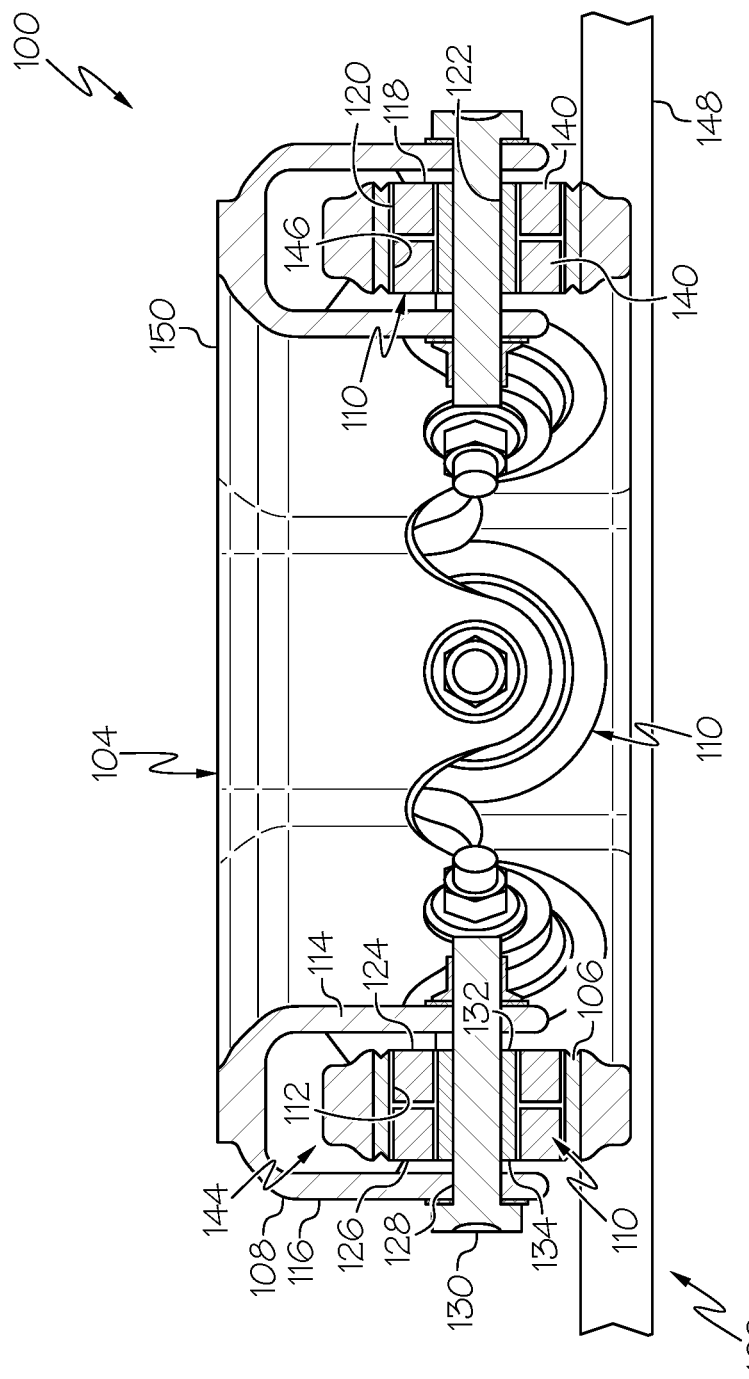
FIG. 6 is a schematic, elevation, sectional view of an example of the isolation coupler.
Figure 7:
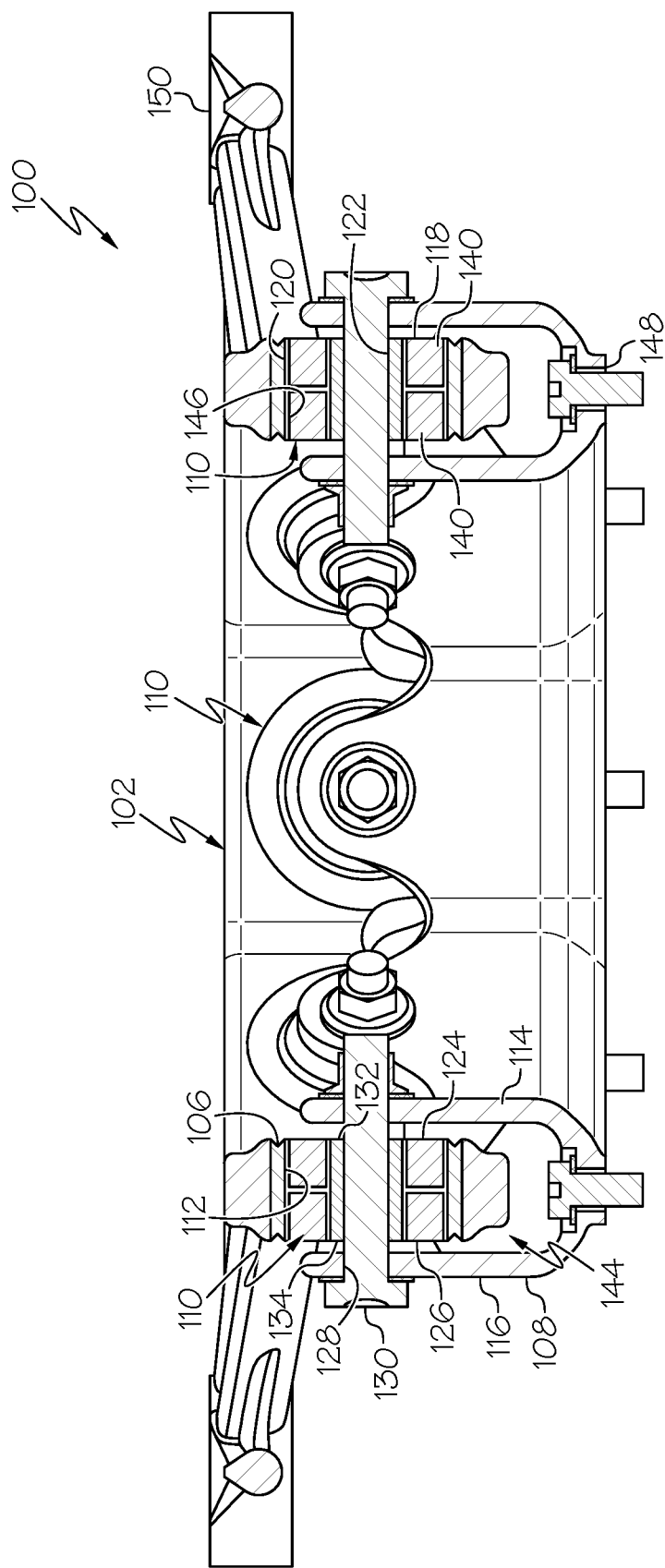
FIG. 7 is a schematic, elevation, sectional view of an example of the isolation coupler.
Figure 8:
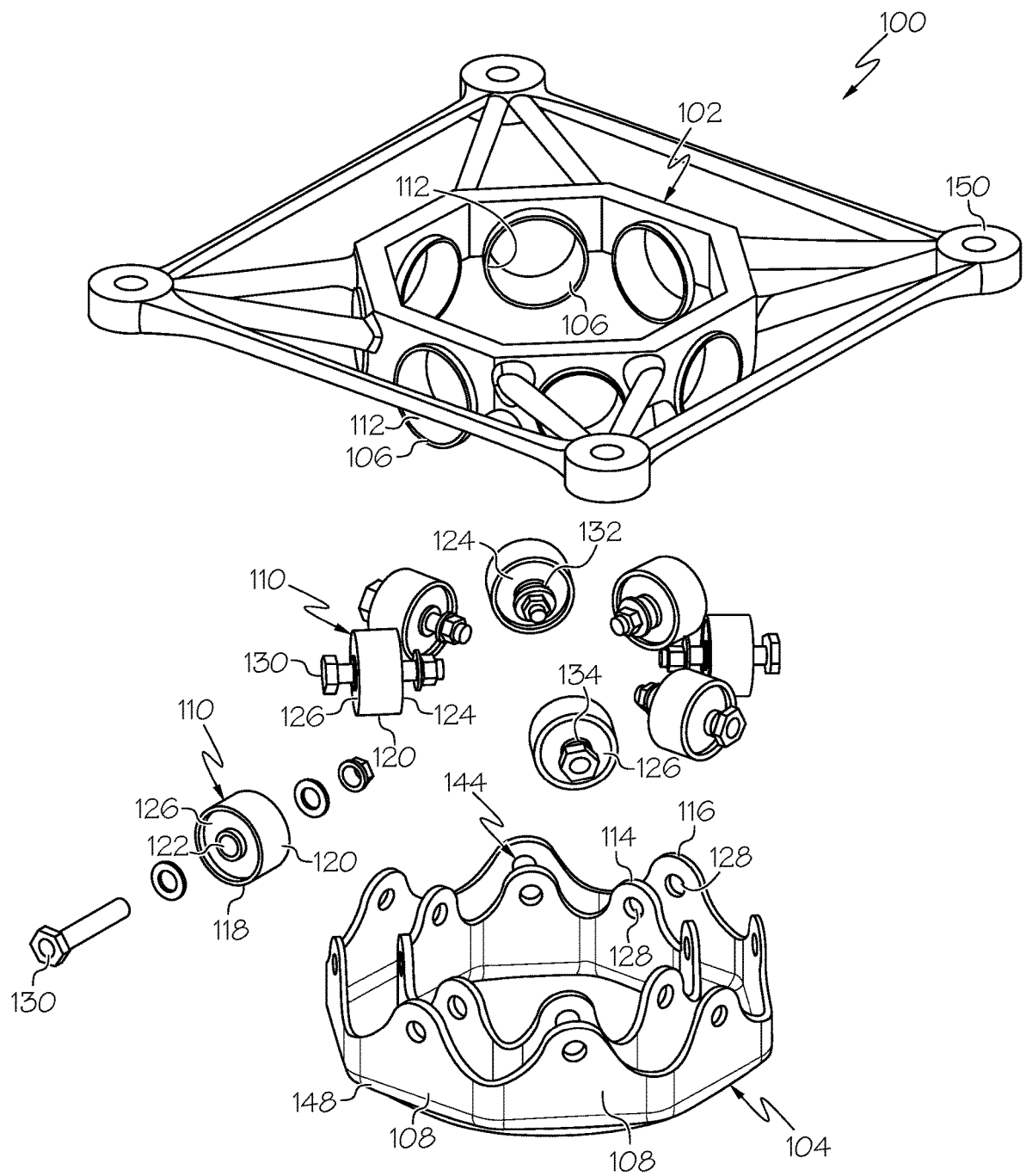
FIG. 8 is a schematic, perspective, exploded view of an example of the isolation coupler.

Referring to FIGS. 6-8, in an example, each one of the second-bracket sides 108 includes a first sidewall 114 (e.g., an inner wall) and a second sidewall 116 (e.g., an outer wall). A portion of each one of the first-bracket sides 106 is located between the first sidewall 114 and the second sidewall 116 of a corresponding one of the second-bracket sides 108. In other words, the first sidewall 114 and the second sidewall 116 of each one of the second-bracket sides 108 defines, or forms, a recess 144 that is complementary to a portion of a corresponding first-bracket side 106. For the purpose of the present disclosure, the term "complementary" describes geometric shapes that fit together with relative precision in a hand-and-glove arrangement, like a shank and a receiver, a tongue and a groove, or a tenon and a mortise.

In an example, as illustrated in FIGS. 1, 2, 4, and 5, one or more of the first-bracket sides 106 and/or one or more of the second-bracket sides 108 has a rectangular two-dimensional shape, in elevation view, with substantially straight edges. In another example, as illustrated in FIGS. 3, 6, 7, and 8, one or more of the first-bracket sides 106 and/or one or more of the second-bracket sides 108 has a complex two-dimensional shape, in elevation view, with at least one contoured edge. The two-dimensional shape of the first-bracket sides 106 and/or the second-bracket sides 108 may be selected, for example, based on the method of manufacture (e.g., additive manufacturing or subtractive manufacturing), material composition, or weight restrictions. For example, material may be located where needed to accommodate the load and eliminated where not needed.

Referring to FIGS. 6-8, in an example, the first bracket 102 includes a number of isolator openings 112 extending through each one of the first-bracket sides 106. Each one of the isolators 110 is located in a corresponding one of the isolator openings 112. As best illustrated in FIGS. 5-8, in an example, each one of the first-bracket sides 106 includes one isolator opening 112. As best illustrated in FIG. 4, in another example, each one of the first-bracket sides 106 include two isolator openings 112. In another example, each one of the first-bracket sides 106 includes more than two isolator openings 112. Generally, the greater the number of isolator openings 112, the higher the degree of flexibility of load attenuation provided between the first bracket 102 and the second bracket 104.

In an example, the number of isolator openings 112 is equal to the number of isolators 110. In other words, the number of isolators 110 selected for a particular application of the isolation coupler 100 (e.g., to achieve a desired level of load attenuation) is such that each one of the isolator openings 112 has a corresponding isolator 110 located within and coupled to the first bracket 102. In another example, the number of isolator openings 112 is greater than the number of isolators 110. In other words, the number of isolators 110 selected for a particular application of the isolation coupler 100 (e.g., to achieve a desired level of load attenuation) is such that at least one (e.g., some) of the isolator openings 112 is without a corresponding isolator 110.

As best illustrated in FIGS. 6 and 7, in an example, each one of the isolators 110 is located in a corresponding one of the isolator openings 112, of a corresponding one of the first-bracket sides 106, and between the first sidewall 114 and the second sidewall 116, of a corresponding one of the second-bracket sides 108. Each one of the isolators 110 engages, or is in contact with, one of the first-bracket sides 106 and a corresponding one of the second-bracket sides 108 to attenuate a load transferred from the first-bracket side 106 to the corresponding second-bracket side 108 and, thus, from the first bracket 102 to the second bracket 104 and, thus, from the support structure 202 to the functional element 204.

As best illustrated in FIGS. 6 and 7, in an example, each one of the isolators 110 includes an isolator body 118 and a peripheral surface 120. The peripheral surface 120 of each one of the isolators 110 engages, or is in contact with, a perimeter surface 146 of a corresponding one of the isolator openings 112.

The isolators 110 may have any one of various shapes and/or sizes. The particular shape and/or size of the isolators 110 may be selected to achieve the desired level of load attenuation. Similarly, the isolator openings 112 may have any one of various shapes and/or sizes. Generally, the shape and/or size of the isolator opening 112 complement the shape and/or size of the isolator 110 so that when the isolator 110 is located in the isolator opening 112, the peripheral surface 120 of the isolator 110 engages the perimeter surface 146 of the first-bracket side 106 that defines, or forms, the isolator opening 112 and the isolator 110 is coupled to the first-bracket side 106 via an interference fit. For the purpose of the present disclosure, the term "interference fit" has its ordinary meaning as known to those skilled in the art and may refer to an engineering fit in which an external dimension of the isolator 110 slightly exceeds an internal dimension of the isolator opening 112 so that the isolator 110 is fixed relative to the first-bracket side 106 when fit within the isolator opening 112.

As best illustrated in FIG. 6-8, in an example, each one of the isolators 110 includes a central opening 122. The central opening 122 extends through the isolator body 118. The second bracket 104 includes a number of fastener openings 128. Each one of the fastener openings 128 extends through a corresponding one of the second-bracket sides 108. In an example, each one of the fastener openings 128 extends through the first sidewall 114 and the second sidewall 116 of a corresponding one of the second-bracket sides 108. In other words, each one of the fasteners openings 128 includes a first portion (e.g., inner portion) that extends through the first sidewall 114 of a corresponding one of the second-bracket sides 108 and a second portion (e.g., outer portion) that extends through the second sidewall 116 of the corresponding one of the second-bracket sides 108.

The second bracket 104 also includes a number of fasteners 130. Each one of the fasteners 130 extends through a corresponding one of the fastener openings 128 and the central opening 122 of a corresponding one of the isolators 110. Each one of the fasteners 130 mechanically couples each one of the first-bracket sides 106 and a corresponding one of the second-bracket sides 108 to each other through a corresponding one of the isolators 110. Thus, the fasteners 130 mechanically couple the first bracket 102 and the second bracket 104 to each other through the isolators 110 to attenuate a load transferred between the first bracket 102 and the second bracket 104.

In an example, additional isolators (not shown) that are substantially similar to the isolators 110 are located within one or more of (e.g., each one of) the fastener openings 128 to attenuate mechanical shock and/or mechanical vibration between the second-bracket sides 108 (e.g., the first sidewall 114 and the second sidewall 116) and the fastener 130.

In an example, when the isolator 110 is fit within the corresponding isolator opening 112, the central opening 122 of the isolator 110, the isolator opening 112, and the fastener openings 128 are coaxially aligned with each other. Generally, the shape and/or size of the central opening 122 of the isolator 110 complement the shape and/or size of the fastener 130 so that when the fastener 130 extends through the fastener openings 128 and the central opening 122, a peripheral surface of the fastener 130 engages a perimeter surface of the isolator body 118 that defines, or forms, the central opening 122 and the fastener 130 is coupled to the isolator 110 via an interference fit. As illustrated in FIGS. 6-8, in an example, the fastener 130 is a mechanical fastener such as a nut and a bolt.

As best illustrated in FIG. 6-10, in an example, one or more (e.g., each one) of the isolators 110 is annular in shape. In other words, the isolator 110 has a circular shape in cross-section, viewed along a center axis of the central opening 122. In such an example, one or more (e.g., each one) of the isolator openings 112 has a complementary circular shape in cross-section, viewed along a center axis of the isolator opening 112. In other examples, the isolators 110 and the isolator openings 112 may have any one of other cross-sectional shapes.

In other examples, one or more of the isolators 110 has a non-circular shape in cross-section, viewed along the center axis of the central opening 122. In such examples, one or more of the isolator openings 112 has a complementary non-circular shape in cross-section, viewed along a center axis of the isolator opening 112. For example, one or more of the isolators 110 and a corresponding one or more of the isolator openings 112 may be triangular, rectangular, hexagonal, star-shaped, or any other suitable geometric shape in cross-section.

As best illustrated in FIGS. 6-10, in an example, each one of the isolators 110 includes a first side 124 (e.g., an inner side) and a second side 126 (e.g., an outer side), opposite the first side 124. When the first bracket 102 and the second bracket 104 are coupled together (e.g., with the isolator 110 located in the isolator opening 112, the first-bracket side 106 located between the first sidewall 114 and the second sidewall 116 of the second-bracket side 108, and the fastener 130 coupled to the first-bracket side 106 and the second-bracket side 108 through the isolator 110), the first side 124 the isolator 110 is proximate to or engages the first sidewall 114 of the second-bracket side 108 and the second side 126 of the isolator 110 is proximate to or engages the second sidewall 116 of the second-bracket side 108.

In an example, at least a portion of the first side 124 of each one of the isolators 110 engages, or is in contact with, the first sidewall 114 of a corresponding one of the second-bracket sides 108. In an example, at least a portion of the second side 126 of each one of the isolators 110 engages, or is in contact with, the second sidewall 116 of a corresponding one of the second-bracket sides 108.

In an example, the first side 124 of each one of the isolators 110 is spaced away from, or is proximate to, but not in contact with, the first sidewall 114 of a corresponding one of the second-bracket sides 108. In an example, the second side 126 of each one of the isolators 110 is spaced away from, or is proximate to, but not in contact with, the second sidewall 116 of a corresponding one of the second-bracket sides 108.

As best illustrated in FIGS. 6-10, in an example, each one of the isolators 110 includes a first flange 132 (e.g., an inner flange) and a second flange 134 (e.g., an outer flange). Only the first side 124 with the first flange 132 of the isolator 110 is visible in FIGS. 9 and 10. The first flange 132 extends from the first side 124 and surrounds the central opening 122. The second flange 134 extends from the second side 126, opposite the first flange 132, and surrounds the central opening 122.

In an example, the first flange 132 and the second flange 134 provide additional contact surface area for engagement by the fastener 130 when attenuating the load.

In an example, when the first bracket 102 and the second bracket 104 are coupled together, the first flange 132 of each one of the isolators 110 is in contact with the first sidewall 114 of a corresponding one of the second-bracket sides 108. In an example, when the first bracket 102 and the second bracket 104 are coupled together, the second flange 134 of each one of the isolators 110 is in contact with the second sidewall 116 of a corresponding one of the second-bracket sides 108.

In an example, when the first bracket 102 and the second bracket 104 are coupled together, the first flange 132 of each one of the isolators 110 is not in contact with the first sidewall 114 of a corresponding one of the second-bracket sides 108. In an example, when the first bracket 102 and the second bracket 104 are coupled together, the second flange 134 of each one of the isolators 110 is not in contact with the second sidewall 116 of a corresponding one of the second-bracket sides 108.

In an example, each one of the isolators 110 includes a plurality of isolator-body sections 140. Generally, the isolator-body sections 140 form the isolator body 118. In the examples illustrated in FIGS. 6 and 7, each one of the isolators 110 includes two isolator-body sections 140. In other examples, one or more of the isolators 110 may include more or less than two isolator-body sections 140. Each of the isolator-body sections 140 includes the central opening 122. The isolator-body sections 140 are arranged in a stacked configuration so that all of the isolator-body sections 140 are located in (e.g., fit within) the isolator opening 112 and that the central openings 122 of all of the isolator-body sections 140 are coaxially aligned. The particular number of isolator-body sections 140 may be selected to vary, or tune, the level of attenuation provided by the isolator 110. Generally, the greater the number of isolator-body sections 140, the higher the level of load attenuation provided between the first bracket 102 and the second bracket 104. Additionally, each one of the isolator-body sections 140 may have the same material composition or at least one of the isolator-body sections 140 may have a different material composition than at least another one of the isolator-body sections 140. The particular combination of different material compositions of the isolator-body sections 140 may be selected to vary, or tune, the level of attenuation provided by the isolator 110.

Furthermore, using the number of isolator-body sections 140 to form the isolator 110 may reduce manufacturing cost and component lead-time. As an illustrative example, in order to sufficiently attenuate the load, the isolator 110 may require a cross-sectional thickness of approximately one inch. In such an example, four isolator-body sections 140, each being one-fourth of an inch thick, may be quickly and inexpensively fabricated from a quarter inch thick sheet of material.

In an example, the isolator body 118 of the isolator 110 is made of an elastomeric material. In an example, at least one of the isolator-body sections 140 (FIGS. 6 and 7) of the isolator 110 is made of an elastomeric material.

In an example, the elastomeric material is a silicone material (e.g., silicone). In another example, the elastomeric material is a rubber material, such as a natural rubber or a synthetic rubber. In another example, the elastomeric material is a fluoroelastomer material (e.g., a fluorocarbon-based synthetic rubber), such as Viton® commercially available from The Chemours Company of Wilmington, Del., United States. In another example, the elastomeric material is a polyurethane material (e.g., a thermosetting polyurethane or a thermoplastic polyurethane). In another example, the elastomeric material is a synthetic viscoelastic urethane polymer, such as Sorbothane commercially available from Sorbothane, Inc., of Kent Ohio.

In an example, each one of the isolator-body sections 140 is made of the same elastomeric material. In another example, at least one of the isolator-body sections 140 is made of a different elastomeric material than at least another one of the isolator-body sections 140.

The isolator 110 and, more particularly, the isolator body 118 may have various material properties, characteristics, and/or parameters, such as hardness, tensile strength, yield strength, elongation, loss factor, outgassing, and the like. Generally, the elastomeric material forming the isolator body 118 of the isolator 110, or any one of the isolator-body sections 140 of the isolator body 118, is selected based on balance between such factors.

In an example, the elastomeric material of the isolator 110 is selected based, at least in part, on a Durometer hardness. In an example, the elastomeric material has a Durometer hardness between approximately thirty (30) and approximately ninety (90). In another example, the elastomeric material has a Durometer hardness between approximately fifty (50) and approximately seventy-five (75). In another example, the elastomeric material has a Durometer hardness between approximately thirty (30) and approximately fifty (50).

In an example, the elastomeric material of the isolator 110 is selected based, at least in part, on loss factor. In an example, the elastomeric material has a loss factor between approximately ten percent (10%) and approximately sixty percent (60%). In an example, the elastomeric material has a loss factor between approximately twenty-five percent (25%) and approximately sixty percent (60%).

In an example, the elastomeric material of the isolator 110 is selected based, at least in part, on outgassing. In an example, the elastomeric material has outgassing of less than approximately six percent (6%) total mass. In another example, the elastomeric material has outgassing of less than approximately one percent (1%) total mass.

In an example, the elastomeric material of the isolator 110 is selected based, at least in part, on one or more of minimum tensile strength, minimum yield strength, and minimum elongation.

Selection of particular material properties of the isolator 110 provides varying degrees of load attenuation, for example, for different magnitudes of forces and/or different vibration frequencies of the load. Generally, the elastomeric material of the isolator 110 is selected to optimize such properties, such as a relatively high Durometer hardness, a relatively high loss factor, and a relatively low outgassing, to achieve the desired load attenuating properties.

Figure 9:
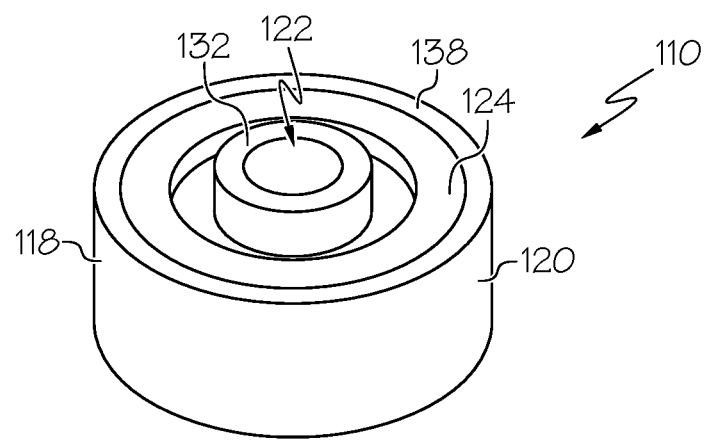
FIG. 9 is a schematic, perspective view of an example of an isolator of the isolation coupler.

As illustrated in FIG. 9, in an example, at least one of, or each one of, the isolators 110 is, or takes the form of, a bearing 138. A core of the bearing 138 forms the isolator body 118 and defines the first side 124 and the second side 126 (FIG. 8) of the isolator 110. An inner race of the bearing 138 defines the central opening 122 of the isolator 110 and forms the first flange 132 and the second flange 134 of the isolator 110. An outer race of the bearing 138 forms the peripheral surface 120 of the isolator 110. In such an example, the core of the bearing 138 is made of the elastomeric material. In such an example, the inner race and the outer race of the bearing 138 are made of a metallic material.

Figure 10:
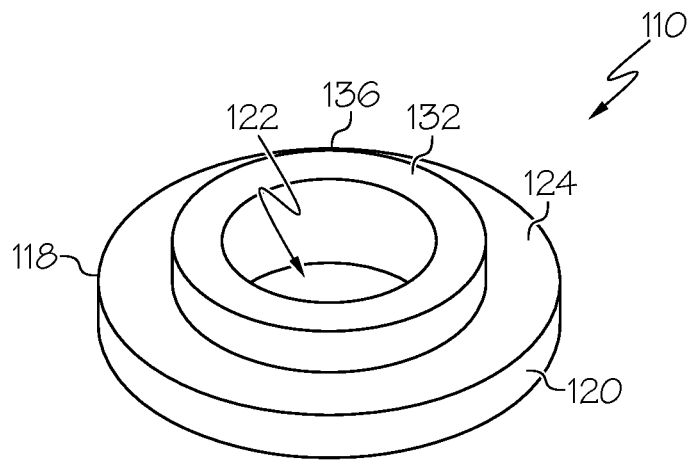
FIG. 10 is a schematic, perspective view of an example of the isolator of the isolation coupler.

As illustrated in FIG. 10, in an example, at least one of, or each one of, the isolators 110 is, or takes the form of, a bushing 136.

In one or more examples, selection of the bearing 138 or the bushing 136 may be based on manufacturing cost, weight, and other factors.

Depending upon the particular application of the isolation coupler 100, the orientation of the first bracket 102 and the second bracket 104 relative to the support structure 202 and the functional element 204 may vary. As illustrated in FIGS. 1, 2, and 4-6, in an example, the first bracket 102 is coupled to, or is configured to be coupled to, the support structure 202 and the second bracket 104 is coupled to, or is configured to be coupled to, the functional element 204. In such an example, the first bracket 102 is a fixture bracket that interfaces with the support structure 202 and the second bracket 104 is a fixture bracket that interfaces with the functional element 204. As illustrated in FIGS. 3, 7, and 8, in an example, the second bracket 104 is coupled to, or is configured to be coupled to, the support structure 202 and the first bracket 102 is coupled to, or is configured to be coupled to, the functional element 204. In such an example, the second bracket 104 is a fixture bracket that interfaces with the support structure 202 and the first bracket 102 is a fixture bracket that interfaces with the functional element 204. In any of such examples, the first bracket 102 is an attenuation bracket that attenuates the load transferred between the first bracket 102 and the second bracket 104.

In an example, the isolation coupler 100 also includes a support-mounting frame 148 and an equipment-mounting frame 150. The support-mounting frame 148 is configured to interface with and be coupled to the support structure 202. The equipment-mounting frame 150 is configured to interface with and be coupled to the functional element 204. The particular configuration of the support-mounting frame 148 may depend, for example, of the type of support structure 202, the type of mobile platform 206, the particular application of the isolation coupler 100, and the like. The particular configuration of the equipment-mounting frame 150 may depend, for example, of the type of functional element 204, the type of mobile platform 206, the particular application of the isolation coupler 100, and the like. As illustrated in FIGS. 1, 2, and 4-6, in an example, the support-mounting frame 148 is coupled to the first bracket 102 and the equipment-mounting frame 150 is coupled to the second bracket 104. As illustrated in FIGS. 3, 7, and 8, in an example, the support-mounting frame 148 is coupled to the second bracket 104 and the equipment-mounting frame 150 is coupled to the first bracket 102.

Referring to FIG. 1, in an example, the isolation coupler 100 also includes a number of struts 142. A first end of each one of the struts 142 is coupled to the support structure 202. An opposing second end of each one of the struts 142 is coupled, is configured to be coupled, to the equipment-mounting frame 150. In the example illustrated in FIG. 1, the struts 142 are coupled to the second bracket 104, to which the functional elements 204 are coupled. However, it should be noted that in the reverse configuration of the first bracket 102 and the second bracket 104, as illustrated in 3, 7, and 8, the struts 142 are coupled to the first bracket 102, to which the functional elements 204 are coupled.

Generally, the struts 142 are used when the functional elements 204 are large and/or heavy and additional support is needed. In an example, one end or both ends of the strut 142 are connected via a clevis joint that utilizes an isolator configuration substantially similar to that of the first bracket 102 and second bracket 104.

Figure 11:
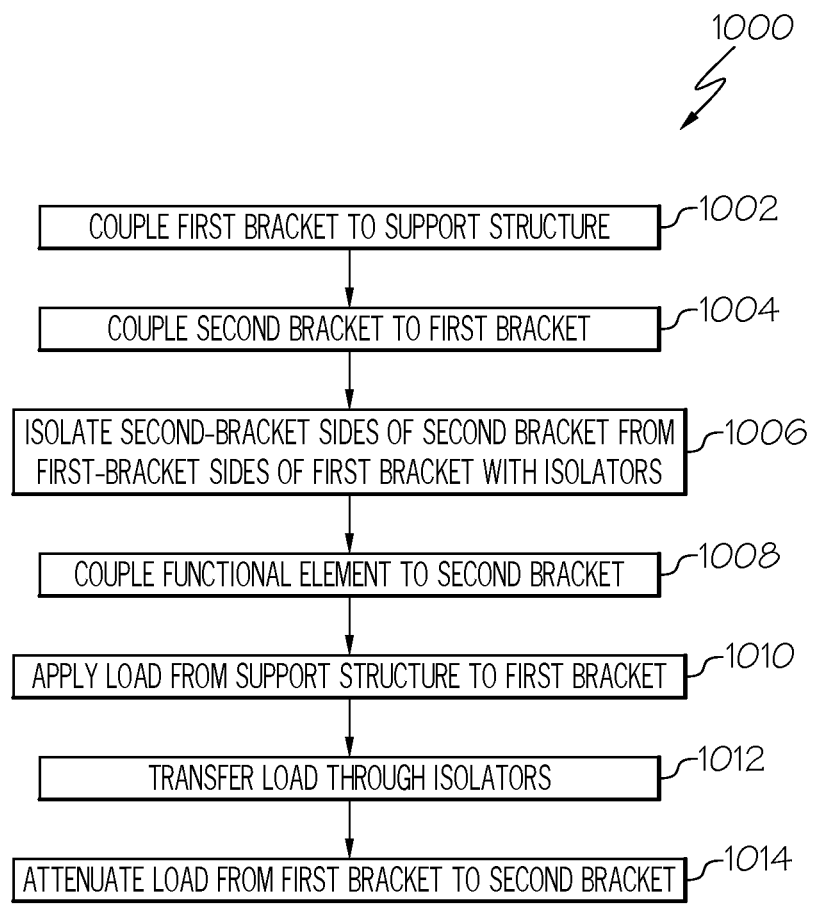
FIG. 11 is a flow diagram of an example of a method for attenuating a load.

Referring to FIG. 11, the present disclosure provides examples of a method 1000 for attenuating a load from the support structure 202 to the functional element 204. Examples of the disclosed method 1000 provide operation implementations of load attenuation using the disclosed isolation coupler 100 illustrated in FIGS. 1-10.

Referring to FIG. 11, in an example, the method 1000 includes a step of coupling the first bracket 102 to the support structure 202 (Block 1002). As illustrated in FIGS. 1-8, the first bracket 102 includes a number of first-bracket sides 106. The number of first-bracket sides 106 forms the polygonal shape, such as the closed polygonal shape, in plan view. The number of isolators 110 is coupled to each one of the first-bracket sides 106 of the first bracket 102.

The method 1000 further includes a step of coupling the second bracket 104 to the first bracket 102 (Block 1004). In an example, the step of coupling the second bracket 104 to the first bracket 102 (Block 1004) includes a step of coupling each one of the number of second-bracket sides 108 of the second bracket 104 to the number of isolators 110, coupled to each one of the first-bracket sides 106 Block 1004. The number of second-bracket sides 108 is equal to the number of first-bracket sides 106 and forms the polygonal shape, in plan view.

The method 1000 also includes a step of isolating the each one of the second-bracket sides 108 from a corresponding one of the first-bracket sides 106 with the number of isolators 110 (Block 1006).

The method 1000 additionally includes a step of coupling the functional element 204 to the second bracket 104 (Block 1008).

The method 1000 further includes a step of applying the load from the support structure 202 to first bracket 102 (Block 1010). The method 1000 also includes a step of transferring the load from the first bracket 102 to the second bracket 104 through the isolators 110 (Block 1012). The method 1000 additionally includes a step of attenuating the load from the first bracket 102 to the second bracket 104 when transferring the load through the isolators 110 (Block 1014).

During the step of attenuating the load from the first bracket 102 to the second bracket 104 (Block 1014), both an axial direction and a lateral direction of the load may be attenuated. In an example, the axial direction of the load is attenuated via interaction between the first side 124, or the first flange 132, of the isolator 110 with the first sidewall 114 of the second-bracket side 108 (FIGS. 6-8) and via interaction between second side 126, or the second flange 134, of the isolator 110 with the second sidewall 116 of the second-bracket side 108 (FIGS. 6-8). In an example, the lateral direction of the load is attenuated via interaction between the fastener 130 and the isolator 110 and via interaction between the peripheral surface 120 of the isolator 110 and the perimeter surface 146 of the first-bracket side 106 defining the isolator opening 112.

While the example of the method 1000 is described in relation to a configuration of the isolation coupler 100 in which the first bracket 102 is coupled to the support structure 202 and the second bracket 104 is coupled to the functional element 204, in another example, the method 1000 is equally applicable to a reversed configuration of the isolation coupler 100 in which the second bracket 104 is coupled to the support structure 202 and the first bracket 102 is coupled to the functional element 204.

Figure 13:
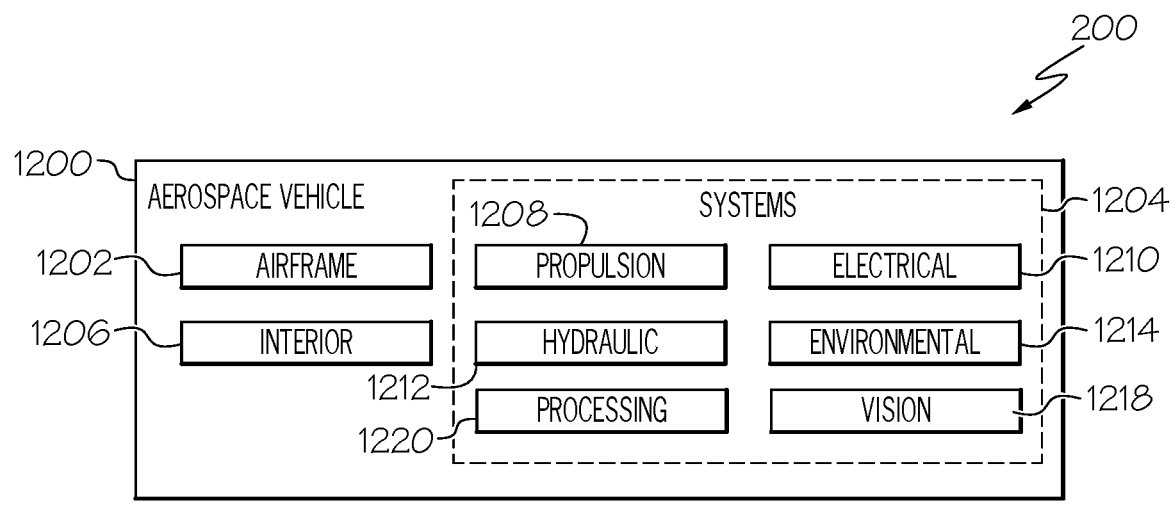
FIG. 13 is a schematic illustration of an example of an aircraft.

Examples of the isolation coupler 100, the structural assembly 200, and the method 1000 disclosed herein may find use in a variety of potential applications, particularly in the transportation industry, including for example, aerospace applications. Referring now to FIGS. 12 and 13 examples of the isolation coupler 100, the structural assembly 200, and the method 1000 may be used in the context of an aircraft manufacturing and service method 1100, as shown in the flow diagram of FIG. 12 and the aerospace vehicle 1200, as shown in FIG. 13. Aerospace applications of the disclosed examples may include load attenuation between a supporting structure of the vehicle and a piece of functional equipment of the vehicle.

FIG. 13 is an illustrative example of the aerospace vehicle 1200. The aerospace vehicle 1200 includes an airframe 1202 and a plurality of high-level systems 1204 and an interior 1206. Examples of the high-level systems 1204 include one or more of the propulsion system 1208, the electrical system 1210, a hydraulic system 1212, an environmental system 1214, the vision system 1218, the processing system 1220, and a communications system. In other examples, the aerospace vehicle 1200 may include any number of other types of systems.

As illustrated in FIG. 12, during pre-production, the illustrative method 1100 may include specification and design of the aerospace vehicle 1200 (Block 1102) and material procurement (Block 1104). During production of the aerospace vehicle 1200, component and subassembly manufacturing (Block 1106) and system integration (Block 1108) of the aerospace vehicle 1200 may take place. Thereafter, the aerospace vehicle 1200 may go through certification and delivery (Block 1110) to be placed in service (Block 1112). The disclosed systems and methods may form a portion of component and subassembly manufacturing (Block 1106) and/or system integration (Block 1108). Routine maintenance and service (Block 1114) may include modification, reconfiguration, refurbishment, etc. of one or more systems of the aerospace vehicle 1200.

Each of the processes of the method 1100 illustrated in FIG. 12 may be performed or carried out by a system integrator, a third party, and/or an operator (e.g., a customer). For the purposes of this description, a system integrator may include, without limitation, any number of manufacturers and major-system subcontractors; a third party may include, without limitation, any number of vendors, subcontractors, and suppliers; and an operator may be an airline, leasing company, military entity, service organization, and so on.

Examples of the isolation coupler 100, the structural assembly 200, and the method 1000 shown or described herein may be employed during any one or more of the stages of the manufacturing and service method 1100 shown in the flow diagram illustrated by FIG. 12. For example, components or subassemblies, such as those that include the structural assembly 200 with the isolation coupler 100, corresponding to component and subassembly manufacturing (Block 1106) may be fabricated or manufactured in a manner similar to components or subassemblies produced while the aerospace vehicle 1200 (FIG. 13) is in service (Block 1112). Also, one or more examples of the system and method disclosed herein may be utilized during production stages (Blocks 1108 and 1110). Similarly, one or more examples of the system and method disclosed herein may be utilized, for example and without limitation, while the aerospace vehicle 1200 is in service (Block 1112) and during maintenance and service stage (Block 1114).

Although an aerospace example is shown, the principles disclosed herein may be applied to other industries, such as the automotive industry, the space industry, the construction industry, and other design and manufacturing industries. Accordingly, in addition to aerospace vehicles, the principles disclosed herein may apply to other vehicle structures (e.g., land vehicles, marine vehicles, space vehicles, etc.) and stand-alone structures.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

For the purpose of this disclosure, the terms "coupled," "coupling," and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In FIGS. 11 and 12, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 11 and 12 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples of the disclosed systems and methods have been shown and described, modifications may occur to those skilled in the art upon reading the specification. The present application includes such modifications and is limited only by the scope of the claims.

What is claimed is:

1. A structural assembly for attenuating a load, the structural assembly comprising:
a support structure;
a functional element; and
an isolation coupler that connects the functional element and the support structure, the isolation coupler comprising:
a first bracket comprising a number of first-bracket sides, wherein the number of first-bracket sides forms a closed polygonal shape, in plan view;
a number of isolators coupled to each one of the first-bracket sides; and
a second bracket comprising a number of second-bracket sides coupled to the isolators, wherein the number of second-bracket sides is equal to the number of first-bracket sides and forms the closed polygonal shape, in plan view, and each one of the second-bracket sides comprises a first sidewall and a second sidewall, opposing the first wall,
wherein:
a portion of each one of the first-bracket sides is located between the first sidewall and the second sidewall of a corresponding one of the second-bracket sides; and
each one of the isolators separates one of the first-bracket sides from a corresponding one of the second-bracket sides to attenuate a load transferred from the first bracket to the second bracket.

2. The structural assembly of claim 1, wherein the first bracket further comprises a number of isolator openings.

3. The structural assembly of claim 2, wherein each one of the isolator openings extends through one of the first-bracket sides.

4. The structural assembly of claim 2, wherein each one of the isolators is located in a corresponding one of the isolator openings, between the first sidewall and the second sidewall.

5. The structural assembly of claim 4, wherein each one of the isolators comprises an isolator body and a peripheral surface.

6. The structural assembly of claim 5, wherein the peripheral surface of each one of the isolators engages a perimeter surface of a corresponding one of the isolator openings.

7. The structural assembly of claim 6, wherein each one of the isolators further comprises a central opening extending through the isolator body.

8. The structural assembly of claim 7, wherein the second bracket further comprises a number of fastener openings, wherein each one of the fastener openings extends through the first sidewall and the second sidewall.

9. The structural assembly of claim 8, wherein the second bracket further comprises a number of fasteners, wherein each one of the fasteners extends through a corresponding one of the fastener openings and the central opening of a corresponding one of the isolators.

10. The structural assembly of claim 9, wherein each one of the isolators further comprises a first side, wherein a portion of the first side of each one of the isolators is in contact with the first sidewall of one of the second-bracket sides.

11. The structural assembly of claim 10, wherein each one of the isolators further comprises a second side opposite the first side, wherein a portion of the second side of each one of the isolators is in contact with the second sidewall of one of the second-bracket sides.

12. The structural assembly of claim 11, wherein each one of the isolators further comprises a first flange extending from the first side and surrounding the central opening, wherein the first flange of each one of the isolators is in contact with the first sidewall of one of the second-bracket sides.

13. The structural assembly of claim 12, wherein each one of the isolators further comprises a second flange extending from the second side and surrounding the central opening, wherein the second flange of each one of the isolators is in contact with the second sidewall of one of the second-bracket sides.

14. The structural assembly of claim 1, wherein the support structure comprises a frame of a vehicle.

15. The structural assembly of claim 14, wherein the functional element comprises at least one of a camera and an engine.

16. The structural assembly of claim 1, wherein the number of isolators coupled to at least one of the first-bracket sides is different than the number of isolators coupled to at least another one of the first-bracket sides.

17. The structural assembly of claim 1, wherein each one of the isolators is annular.

18. A method for attenuating a load from a support structure to a functional element, the method comprising:
coupling a first bracket to one of the support structure or the functional element, the first bracket comprising a number of first-bracket sides, wherein the number of first-bracket sides forms a closed polygonal shape, in plan view;
coupling each one of a number of second-bracket sides of a second bracket to a number of isolators coupled to each one of the first-bracket sides, wherein the number of second-bracket sides is equal to the number of first-bracket sides and forms the closed polygonal shape, in plan view, each one of the second-bracket sides comprises a first sidewall and a second sidewall, opposing the first sidewall, and a portion of each one of the first-bracket sides is located between the first sidewall and the second sidewall of a corresponding one of the second-bracket sides;
coupling the functional element to another one of the first bracket or the second bracket;
applying the load from the support structure to the functional element; and
attenuating the load between the first bracket and the second bracket by transferring the load through the isolators.

19. A structural assembly for attenuating a load, the structural assembly comprising:
a support structure;
a functional element; and
an isolation coupler that connects the functional element and the support structure, the isolation coupler comprising:
a first bracket comprising a number of first-bracket sides and a number of isolator openings, wherein each one of the isolator openings extends through one of the first-bracket sides;
a second bracket comprising a number of second-bracket sides, wherein the number of second-bracket sides is equal to the number of first-bracket sides and each one of the second-bracket sides comprises a first sidewall and a second sidewall, opposing the first sidewall; and
a number of isolators coupled to each one of the first-bracket sides and each one of the second bracket sides,
wherein:
the support structure coupled to one of the first bracket or the second bracket;
the functional element coupled to another one of the first bracket or the second bracket;
a portion of each one of the first-bracket sides is located between the first sidewall and the second sidewall of a corresponding one of the second-bracket sides; and
each one of the isolators separates one of the first-bracket sides from a corresponding one of the second-bracket sides to attenuate a load transferred from the first bracket to the second bracket.

20. The structural assembly of claim 19, wherein:
each one of the isolators is located in a corresponding one of the isolator openings, between the first sidewall and the second sidewall;
each one of the isolators comprises an isolator body and a peripheral surface; and
the peripheral surface of each one of the isolators engages a perimeter surface of a corresponding one of the isolator openings.

* * * * *